June 13, 1967  D. YATES  3,325,191
LINED PIPE JOINT AND PROCESS OF FORMING SAME
Filed May 1, 1964
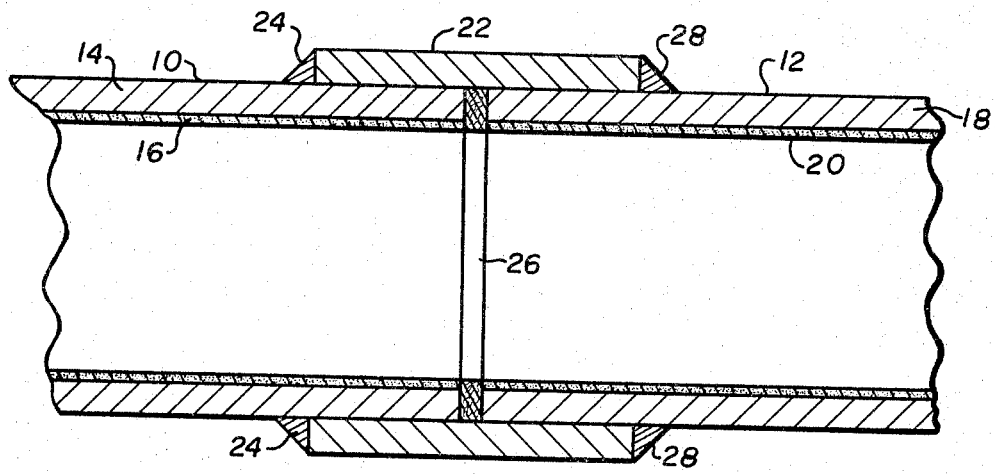
INVENTOR.
DICK YATES
BY
ATTORNEY United States Patent Office 3,325,191
Patented June 13, 1967

3,325,191
LINED PIPE JOINT AND PROCESS OF
FORMING SAME
Dick Yates, Midland, Tex., assignor to Gulf Oil Corporation, Pittsburgh, Pa., a corporation of Pennsylvania
Filed May 1, 1964, Ser. No. 364,089
11 Claims. (Cl. 285—55)

This invention relates to a method and apparatus for joining sections of cement lined pipe and, more particularly, it relates to a method of welding cement lined pipe whereby corrosion of the pipe joints by fluids flowing through the pipe is prevented.

The use of an inner cement lining in steel pipe has been attempted in various instances where such pipe is subject to corrosion by the fluids conducted therethrough. The cement lining ordinarily comprises a mixture of natural pozzolans and Portland cement blended to give maximum density and essentially an impermeable skin that is bonded to the inner wall of the pipe. The lining ranges in thickness from approximately ⅛ to about ¼ inch, with a tolerance of plus or minus ¹⁄₃₂ inch. Among the various methods that have been suggested for joining sections of cement lined pipe, the welded joint is presently the most popular means, but that method tends to damage the cement liner at the edge of the pipe sections because of the heat from the welding rod which is conducted to the cement liner along the ends of the adjacent pipe sections.

One method recommended to prevent the burning of the cement lining at the joint of lined pipe sections is to place an asbestos gasket at the joint. The gasket has an inner diameter equal to the inner diameter of the cement lining and an outer diameter approximately equal to the outer diameter of the cement lining. In addition to insulating the cement liner from the heat of the welding rod, the asbestos gasket is intended to expand upon contact with the conducted fluids and provide a fluid-tight seal at the joint, thereby preventing the corrosive fluids from reaching the steel wall of the pipe.

Another method recommended for the prevention of damage to the cement liner involves the application to the ends of adjacent pipe sections of a highly heat-resistant material which ultimately sets to provide a fluid-tight seal at the pipe joint. To provide effective protection of the pipe joint, the heat-resistant compound must provide a reasonably uniform thickness around the pipe ends that is maintained intact during the welding operation and is not eroded by subsequent flow of fluids through the pipe.

Various tests have been conducted using the above methods for prevention of damage to a welded joint in cement lined pipe and in most cases, in spite of the use of such preventive methods, the cement lining is burned by the welding and damaged to the extent that it can not successfully serve its intended purpose. Field experience in the use of cement lined pipe indicates that the joint areas are the most susceptible to corrosion damage from the conducted fluids, and effective joint make-up in cement lined pipe remains a problem.

Another disadvantage arising from the presently employed methods of joining sections of cement lined pipe is that, generally, plain end cement lined pipe cannot be used with welded joints. The placement of a bead weld around the ends of adjacent sections of plain end pipe usually does not provide a sufficiently strong joint. Therefore, bevel end pipe is ordinarily used, and a single V butt weld is placed around the pipe joint in the circumferential notch formed by the abutting ends of the pipe sections. Consequently, a method for connecting plain end cement lined pipe which produces a sufficiently strong joint is desirable.

It is an object of this invention to provide a method for obtaining a welded joint in cement lined pipe which does not damage the cement lining of the pipe and which thereby prevents corrosion of the pipe walls in the joint area.

This invention resides in a method for joining sections of lined pipe comprising welding a steel collar to the adjoining ends of the pipe sections. The points at which the collar is welded to the outer surfaces of the pipe sections are longitudinally displaced from the ends of adjacent pipe sections a sufficient distance to prevent damage to the cement lining of the pipe resulting from excessive heating of the lining.

The accompanying drawing is a longitudinal section view showing two sections of cement lined pipe joined by a welded collar and having an asbestos gasket to form a fluid seal between the pipe ends.

Referring to the drawing, a section of pipe 10 is shown as having an end coaxially connected to the end of another section of pipe 12. The section 10 comprises a steel outer wall 14 having a relatively thin protective inner cement lining 16 bonded to the outer wall 14. Similarly, the section 12 comprises a steel outer wall 18 having a relatively thin protective inner cement lining 20 bonded to the outer wall 18. A cylindrical steel collar 22 is slipped over the end of section 10 and secured thereto by a fillet weld 24 around the circumference of section 10. The welding is accomplished preferably by means of an electric arc using a covered metallic electrode which fuses into the pipe wall and produces a weld metal having physical properties similar to those of the pipe itself.

Next an asbestos gasket 26 is inserted in collar 22 adjacent the end of section 10 as shown in the drawing. Another section of pipe 12 is inserted in the open end of collar 22 and is urged against gasket 26 to compress the gasket between pipe sections 10 and 12. Then collar 22 is secured to the wall of screen 12 by a second fillet weld 28 around the circumference of section 12.

A welded collar joint formed according to the method of this invention provides an improved joint between sections of cement lined pipe because it is not subject to the shortcomings inherent in the presently employed methods of joining such pipe. The length of collar 22 is selected to assure that the welds 24 and 28 are displaced along the outer wall of pipe sections 10 and 12 a sufficient distance from the adjacent ends of the pipe sections to prevent damage to the ends of cement linings 16 and 20 from the heat of welding. It is preferred that collar 22 have a length of from about ½ to about 1½ times the nominal outside diameter of the cement lined pipe. Collar 22 covers the adjacent ends of the pipe sections and extends a substantially equal distance along the ends of both pipe sections 10 and 12, thereby supporting and aligning sections 10 and 12 and preventing movement of the sections during welding. In addition, the use of a welded pipe collar according to the method of this invention makes possible the use of plain end cement lined pipe, instead of bevel end pipe which is now commonly employed, because the two fillet welds 24 and 28 around collar 22 provide greater strength than a single bead weld around the adjoining edges of plain end pipe. Furthermore, collar 22 completely encircles the ends of pipe sections 10 and 12, thereby centering gasket 26 and facilitating substantial compression of gasket 26 between pipe sections 10 and 12.

Gasket 26 is represented in the drawing as an asbestos gasket of a type conventionally used in joining sections of cement lined pipe. However the gasket can be made of any material that provides an effective fluid seal at the pipe joint and that prevents contact of the pipe walls by the particular corrosive fluids conducted through the pipe. Suitable materials for the gasket can be selected, therefore, from such materials as rubber, glass fabric, cork composition, asbestos, Teflon, plastic, and various compositions of those materials.

As an alternative means for providing a fluid seal at the pipe joint by which the pipe walls are protected from contact with corrosive fluids, the ends of pipe sections 10 and 12 are buttered with a time-setting sealing compound that forms a fluid-tight seal of substantially uniform thickness around the edges of the pipe sections and is not eroded by the subsequent flow of fluids therethrough. The thickness of the sealing compound when compressed between the ends of the pipe sections should be at least 1/16 inch and preferably from about 1/8 to about 1/2 inch. This method of sealing the pipe ends is often preferred in instances in which the pipe is subjected to extreme daily or seasonal temperature variations. Certain commercially available sealing compounds having elasticities as high as 500 percent after set-up and are therefore suitable as pipe joint sealing compounds where wide temperature variation causes extreme joint stresses resulting from expansion and contraction of the pipe sections. Examples of such compounds are Holzon Clear Primer, a plasticized rubber-base coating especially designed to impart a smooth, glassy finish over concrete surfaces, and Hornflex (L.P. 32), a concentrated synthetic rubber latex base that is mixed with a cold vulcanizing ingredient and applied to expansion joints as an adhesive. Both of the above compounds are manufactured by the W. R. Grace Company, A. C. Horn Division, Houston, Texas.

The materials and procedural steps described herein are presented only by way of illustration of the concept of this invention and are not intended to be exclusive of other suitable materials or procedures which effect a fluid-tight connection of sections of cement lined pipe within a welded cylindrical collar while maintaining the cement liner safe from damage by the welding operation. The complete method of joining the cement lined pipe described above can be applied to the pipe on location in the field or, in the alternative, a steel collar can be welded to one end of each section of pipe at the factory, thereby reducing the time required to complete a pipe joint in the field. In the application of the process of this invention, sections of cement lined pipe can be effectively joined by welding without damage to the inner cement lining from the heat generated in the welding process. Because the welding points are longitudinally displaced from the ends of the pipe to be joined, the cement lining at the pipe ends is protected, and the heat reaching the cement lining is conducted through the full thickness of the pipe wall rather than by the more direct transfer of heat along adjacent ends of the pipe sections which occurs in the conventionally used methods of welding such joints.

I claim:

1. A method of connecting coaxially two sections of steel pipe, each having an inner cement lining, comprising inserting between the adjacent ends of a pair of steel pipe sections lined with cement sealing means to provide an annular fluid-tight seal therebetween whereby the diameter of the passage through said pipe sections is maintained substantially equal to the normal inside diameter of the pipe, covering completely the sealing means and the adjacent ends of the pipe sections with a cylindrical steel pipe collar having a length sufficient to assure that a metal weld around the end of said collar does not damage said cement linings by excessive heating thereof, and circumferentially welding each end of said steel collar to the outer surfaces of the adjacent steel pipe sections.

2. A method of connecting two sections of steel pipe having inner cement linings comprising connecting a tubular steel collar coaxially to one end of the first of a pair of steel pipe sections lined with cement by circumferentially welding the first end of said first steel collar to the outer surface of said first steel pipe section, inserting a ring-shaped gasket into the collar adjacent the end of said first pipe section, inserting an end of the second of said pipe sections into the collar, urging the end of said second pipe section into forceable engagement with the gasket, thereby providing a fluid-tight seal around the ends of the pipe sections, circumferentially welding the second end of said steel collar to the outer surface of said second steel pipe section, and selecting the length of the collar to assure that the collar covers completely the gasket and the adjacent ends of the pipe sections and to assure that the welded collar ends are displaced along the pipe sections a sufficient distance from the gasket to prevent damage to the cement linings by the excessive heating thereof.

3. A method of connecting two sections of steel pipe having inner cement linings comprising buttering one end of the first of a pair of steel pipe sections lined with cement with a heat resistant time-setting sealing compound, sliding a tubular steel collar over the buttered end of the first of said pipe sections, circumferentially welding the first end of said steel collar to the outer surface of said first steel pipe section, inserting an end of the second of said pipe sections into the collar, urging the pipe sections together to compress the sealing compound and form a fluid-tight seal around the adjacent ends of the pipe sections, circumferentially welding the second end of said steel collar to the outer surface of said second steel pipe section, and selecting the length of the collar to assure that the collar covers completely the gasket and the adjacent ends of the pipe sections and to assure that the welded collar ends are displaced along the pipe sections a sufficient distance from the fluid-tight seal to prevent damage to the cement linings by the excessive heating thereof.

4. A method according to claim 3 wherein the fluid-tight seal formed by urging the pipe sections together has a thickness of from about 1/4 to 1/2 inch.

5. A pipe joint for coaxially coupling sections of steel pipe having inner cement linings comprising an annular sealing means compressed between the adjacent ends of a pair of steel pipe sections lined with cement and adapted to provide a fluid-tight seal to prevent contact of the external walls of the pipe sections by fluid conducted therethrough while maintaining the diameter of the passage through the adjacent ends of said pipe sections substantially equal to the normal inside diameter of the pipe, and a cylindrical steel collar completely covering said sealing means and extending over the adjacent ends of the pipe sections concentric with the longitudinal axis of the pipe sections, said collar being secured around the outer surface of each of said pipe sections by circumferential welds around the ends of the collar, and said collar having sufficient length to assure that the welds are displaced along the outer surfaces of the pipe sections a sufficient distance from the ends of the pipe sections to prevent damage to the cement linings by the heat of welding.

6. A pipe joint according to claim 5 wherein the sealing means between adjacent ends of the steel pipe sections comprises a deformable impervious ring-shaped gasket.

7. A pipe joint according to claim 5 wherein the sealing means between adjacent ends of the steel pipe sections comprises a sealing compound adapted to form a permanent impervious annular band between the adjacent ends of the pipe sections.

8. A pipe joint according to claim 5 wherein the sealing means between adjacent ends of the steel pipe sections comprises a deformable impervious ring-shaped gasket having an inner diameter substantially equal to the inner diameter of the cement lining and an outer diameter substantially equal to the outer diameter of said pipe.

9. A pipe joint according to claim 5 wherein the sealing means between adjacent ends of the steel pipe sections comprises a substantially uniform annular band of a heat resistant time-setting sealing compound having a thickness of from about 1/4 to about 1/2 inch.

10. A pipe joint according to claim 5 wherein the sealing means between adjacent ends of the steel pipe sections comprises a substantially uniform annular band of a heat resistant time-setting sealing compound having a thickness of at least 1/16 inch.

11. A pipe joint for coaxially coupling sections of steel pipe having inner cement linings comprising a pair of steel pipes lined with cement in end-to-end position, sealing means engaging the adjacent ends of the two pipes to prevent leakage therebetween, said sealing means having a central opening therethrough substantially the diameter of the passage through the pipe sections, a steel collar encircling the sealing means and the adjacent ends of the pipe sections, said collar extending longitudinally over the pipe sections a distance from the sealing means to prevent damage to the cement linings by the heat of welding, and a circumferential weld at each end of the collar securing the collar to the outer surface of the adjacent pipe section.

References Cited

UNITED STATES PATENTS

| | | | |
|---|---|---|---|
| 595,437 | 12/1897 | Greenfield | 285—55 X |
| 2,233,734 | 3/1941 | Ely et al. | 285—55 |
| 2,273,154 | 2/1942 | Stromsoe | 285—55 |
| 2,324,928 | 7/1943 | Hill | 285—286 X |
| 2,741,498 | 4/1956 | Elliott | 285—369 X |
| 2,805,872 | 9/1957 | Routh | 285—55 |
| 2,893,758 | 7/1959 | Dufour et al. | 285—286 |
| 3,172,934 | 3/1965 | Krieg | 285—291 X |

FOREIGN PATENTS 102,488  11/1937  Australia.

CHARLIE T. MOON, *Primary Examiner.*